(12) United States Patent
Kim et al.

(10) Patent No.: US 9,383,501 B2
(45) Date of Patent: *Jul. 5, 2016

(54) SCANNER MODULE AND IMAGE SCANNING APPARATUS EMPLOYING THE SAME

(75) Inventors: Kyung Rok Kim, Seongnam-di (KR); Jung Hyuck Cho, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,722

(22) Filed: Mar. 7, 2011

(65) Prior Publication Data

US 2011/0157661 A1 Jun. 30, 2011

Related U.S. Application Data

(63) Continuation of application No. 12/170,965, filed on Jul. 10, 2008, now Pat. No. 7,924,478.

(30) Foreign Application Priority Data

Jul. 11, 2007 (KR) .................. 10-2007-0069502
Jan. 4, 2008 (KR) .................. 10-2008-0001495

(51) Int. Cl.
*H04N 1/04* (2006.01)
*F21V 8/00* (2006.01)
(Continued)

(52) U.S. Cl.
CPC ............ *G02B 6/0038* (2013.01); *G02B 6/0045* (2013.01); *G02B 26/0816* (2013.01);
(Continued)

(58) Field of Classification Search
CPC ............... G02B 6/0038; G02B 6/0045; G02B 26/0816; H04N 1/02815; H04N 1/02835; H04N 1/02885

USPC ......... 358/484, 475, 497, 474, 483, 482, 505, 358/512–514, 509; 250/227.31, 208.1, 250/234–236; 362/223; 399/220, 221; 355/67–70

See application file for complete search history.

(56) References Cited

U.S. PATENT DOCUMENTS 5,850,585 A * 12/1998 Tsutsumi et al. ............. 399/128
5,905,583 A    5/1999 Kawai et al.
(Continued)

FOREIGN PATENT DOCUMENTS

EP   0874517    10/1998
GB   1 394 572   5/1975
(Continued)

OTHER PUBLICATIONS

English language abstract of JP 2004-170858, published Jun. 17, 2004.
(Continued)

*Primary Examiner* — Cheukfan Lee
(74) *Attorney, Agent, or Firm* — Staas & Halsey LLP

(57) ABSTRACT

A scanner module and an image scanning apparatus employing the same include a light source to generate light, a light guide member to guide the light toward an object, a sensor configured to detect the light reflected by the object, at least one reflecting mirror to reflect the light reflected by the object to the sensor, and a focusing lens to focus the reflected light redirected by the at least one reflecting mirror on the sensor. The light guiding member includes an incident surface to receive the light, a reflective surface to reflect the light received through the incident surface, a plurality of guide surfaces to guide the light received through the incident surface, and an exit surface to allow light reflected by the reflective surface to exit. An interval between reflective linear elements increases from a center of the light guide member towards the incident surface.

26 Claims, 21 Drawing Sheets

(51) Int. Cl.
*G02B 26/08* (2006.01)
*H04N 1/028* (2006.01)
*H04N 1/10* (2006.01)
*H04N 1/193* (2006.01)

(52) U.S. Cl.
CPC ....... *H04N1/02815* (2013.01); *H04N 1/02835* (2013.01); *H04N 1/02885* (2013.01); *G02B 6/0055* (2013.01); *G02B 6/0068* (2013.01); *H04N 1/1017* (2013.01); *H04N 1/193* (2013.01); *H04N 2201/0081* (2013.01)

(56) References Cited

U.S. PATENT DOCUMENTS

| | | | |
|---|---|---|---|
| 6,127,675 A * | 10/2000 | Nakamura et al. | 250/227.31 |
| 6,206,534 B1 | 3/2001 | Jenkins et al. | |
| 6,295,141 B1 | 9/2001 | Ogura et al. | |
| 6,326,602 B1 | 12/2001 | Tabata | |
| 6,360,030 B1 | 3/2002 | Kawai et al. | |
| 6,512,600 B1 | 1/2003 | Kawai et al. | |
| 6,540,377 B1 | 4/2003 | Ota et al. | |
| 7,071,616 B2 | 7/2006 | Shimizu et al. | |
| 7,209,268 B2 * | 4/2007 | Ikeda | 358/475 |
| 7,308,187 B2 * | 12/2007 | Saito et al. | 385/147 |
| 7,538,911 B2 | 5/2009 | Sakurai et al. | |
| 7,548,352 B2 | 6/2009 | Sakurai et al. | |
| 7,924,478 B2 * | 4/2011 | Kim | G02B 6/0038 358/474 |
| 2003/0189827 A1 | 10/2003 | Cheng | |
| 2005/0150956 A1 | 7/2005 | Ikeda et al. | |
| 2005/0200917 A1* | 9/2005 | Kanesaka et al. | 358/486 |
| 2005/0265684 A1 | 12/2005 | Nemoto et al. | |
| 2006/0165370 A1 | 7/2006 | Nemoto et al. | |
| 2007/0019249 A1 | 1/2007 | Osakabe | |
| 2008/0198427 A1* | 8/2008 | Wang | 358/497 |
| 2009/0015883 A1 | 1/2009 | Kim | |
| 2009/0015886 A1 | 1/2009 | Kim et al. | |
| 2015/0181070 A1* | 6/2015 | Tanaka | G02B 6/0096 358/475 |

FOREIGN PATENT DOCUMENTS

| | | |
|---|---|---|
| JP | 02-226626 | 9/1990 |
| JP | 06-208066 | 7/1994 |
| JP | 2001045233 | 2/2001 |
| JP | 2002-135533 | 5/2002 |
| JP | 2003-046735 | 2/2003 |
| JP | 2004-170858 | 6/2004 |
| JP | 2006-148956 | 6/2006 |
| KR | 10-2003-035966 | 5/2003 |
| KR | 10-2006-023571 | 3/2006 |
| WO | WO 2006120932 A1 * | 11/2006 |

OTHER PUBLICATIONS

Machine English language translation of JP 2004-170858, published Jun. 17, 2004.
English language abstract of JP 2006-148956, published Jun. 8, 2006.
Machine English language translation of JP 2006-148956, published Jun. 8, 2006.
English language abstract of KR 10-2003-35966, published May 9, 2003.
English language abstract of KR 10-2006-23571, published Mar. 14, 2006.
European Search Report issued in Application No. 08153746.6 mailed Jul. 30, 2008.
English language abstract of JP 2002-135533, published May 10, 2002.
Machine English language translation of JP 2002-135533, published May 10, 2002.
European Search Report issued in European Application No. 08 16 0134.6 mailed Jun. 12, 2009.
English language abstract of JP 06-208066, published Jul. 26, 1994.
Machine English language translation of JP 06-208066, published Jul. 26, 1994.
English language abstract of JP 2003-046735, published Feb. 14, 2003.
Machine English language translation of JP 2003-046735, published Feb. 14, 2003.
Office Action issued in U.S. Appl. No. 12/170,935 mailed Oct. 5, 2009.
English language abstract of JP 02-226626, mailed Sep. 10, 1990.
Korean Office Action dated Jan. 7, 2013 issued in KR Application No. 10-2008-0001495.
U.S. Office Action mailed Oct. 26, 2009 in parent U.S. Appl. No. 12/170,965 (now patented as U.S. Pat. No. 7,924,478).
U.S. Final Office Action mailed Apr. 15, 2010 in parent U.S. Appl. No. 12/170,965 (now patented as U.S. Pat. No. 7,924,478).
U.S. Final Office Action and Interview Summary issued Oct. 14, 2010 in parent U.S. Appl. No. 12/170,965 (now patented as U.S. Pat. No. 7,924,478).
U.S. Notice of Allowance issued Dec. 10, 2010 in parent U.S. Appl. No. 12/170,965 (now patented as U.S. Pat. No. 7,924,478).

* cited by examiner

SCANNER MODULE AND IMAGE SCANNING APPARATUS EMPLOYING THE SAME

CROSS-REFERENCE TO RELATED APPLICATIONS

This application is a continuation application of Ser. No. 12/170,965 filed Jul. 10, 2008 now U.S. Pat. No. 7,924,478, which claims the benefit of Korean Patent Application No. 10-2007-0069502 filed on Jul. 11, 2007 and Korean Patent Application No, 10-2008-0001495 filed on Jan. 4, 2008, in the Korean Intellectual Property Office, the disclosure of which is incorporated herein by reference.

BACKGROUND

1. Field of the Invention

The present invention relates to an image scanning apparatus. More particularly, the present invention relates to a scanner module using a light emitting diode as a light source and an image scanning apparatus employing the same.

2. Description of the Related Art

In general, a scanner module is employed in an image scanning apparatus used for a scanner, a copy machine, a facsimile, or a multi-functional peripheral. The scanner module is installed below a manuscript board of the image scanning apparatus to convert image information into an electric signal by reading the image information of the object loaded on the manuscript board.

Such a scanner module includes a light source generating light, an image sensor receiving light reflected from an object to generate an electric signal based on the light, a reflection mirror, a condenser lens, etc., in which the reflection mirror and the condenser lens are aligned in an optical path formed between the light source and the image sensor. A linear light source, such as a CCFL (cold cathode fluorescent lamp) or a xenon lamp, has been used as a light source for a scanner module employed in a conventional image scanning apparatus.

However, in the case of the CCFL, an initial start-up time exceeds 30 seconds so that an initial scan operation is delayed. In addition, since the CCFL contains Hg, it may cause environmental problem. Further, gas activation is lowered in the lower temperature condition so that the image quality may be degraded. In the case of the xenon lamp, the image quality may be degraded due to high-temperature heat generated from the xenon lamp. In addition, the xenon lamp represents low price competitiveness due to the high price of the xenon lamp.

For this reason, recently, an image scanning apparatus using a point light source, such as a light emitting diode, has been suggested. The image scanning apparatus includes a light guide member for guiding light generated from the point light source. According to the above image scanning apparatus, the point light source may serve as a linear light source by diffusing light in the width direction of an object through the light guide member.

As shown in FIG. 1, a light guide member 2 employed in a conventional image scanning apparatus has a predetermined width in an image scan direction of a scanner module and a predetermined length in a sub-scan direction that is perpendicular to the image scan direction. In addition, the light guide member 2 includes an exit surface 2a facing the object, a reflective surface 2b formed in opposition to the output surface 2a to reflect and diffuse the light generated from a light source 1, and a guide surface 2c formed at both sides of the light guide member 2 to connect the exit surface 2a to the reflective surface 2b and inclined relative to the reflective surface 2b such that the light reflected from the reflective surface 2b can be reflected again toward the exit surface 2c of the light guide member 2.

As shown in FIG. 2, the reflective surface 2b of the light guide member 2 employed in the conventional image scanning apparatus has a plurality of reflective grooves 2d, which extend widthwise along the light guide member 2 in parallel to each other, so that the light generated from the light source 1 is reflected and diffused by the reflective surface 2b and then guided toward the exit surface 2a of the light guide member 2. FIG. 3 shows distribution of light, which is irradiated onto a manuscript surface from the light guide member 2, in the image scan direction.

SUMMARY

However, according to the conventional scanner module and the image scanning apparatus employing the same, the light, which is incident into an upper portion of the guide surface while being reflected from the reflective surface at a small reflection angle, may have an incident angle greater than the critical incident angle that ensures total reflection of the light, so that the light is reflected toward the exit surface of the light guide member. In contrast, the light, which is incident into a lower portion of the guide surface while being reflected from the reflective surface at a large reflection angle, may have an incident angle smaller than the critical incident angle that ensures total reflection of the light, so that the light cannot be reflected, but leaked to the outside through the guide surface, so that the amount of light can be reduced.

Accordingly, it is an aspect of the present invention to provide a scanner module having a light guide member capable of reducing light loss by preventing light from being leaked to an outside through guide surfaces formed at both sides of the light guide member and an image scanning apparatus employing the same.

Additional aspects and/or advantages of the invention will be set forth in part in the description which follows and, in part, will be apparent from the description, or may be learned by practice of the invention.

The foregoing and/or other aspects of the present invention are achieved by providing a scanner module comprising a light source generating light to be irradiated onto an object, and a light guide member for guiding the light generated from the light source toward the object, wherein the light guide member has a reflective surface for reflecting the light generated from the light source and a plurality of guide surfaces that reflect the light, which is reflected from the reflective surface, such that the light is guided into the object.

The guide surfaces include a pair of first guide surfaces which are inclined from both ends of the reflective surface while forming an obtuse angle relative to the reflective surface, and a pair of second guide surfaces which are inclined from end portions of the first guide surfaces while forming an obtuse angle relative to the first guide surfaces.

An angle between the reflective surface and the first guide surface is equal to or greater than a sum of a critical incident angle ensuring total reflection of light and an angle of 90°.

An angle between the first and second guide surfaces is designed such that an incident angle of the light, which is incident into the second guide surface while being reflected from the reflective surface, is equal to or greater than a critical incident angle.

An angle between the second guide surface formed on one side of the light guide member and a predetermined virtual line is equal to or greater than a sum of the critical incident angle and an angle of 90°, in which the virtual line extends from an edge serving as a boundary between the reflective surface and the second guide surface formed at the other side of the light guide member to an edge serving as a boundary between the first guide surface and the second guide surface formed at one side of the light guide member.

The light guide member includes polymethyl methacrylate resin having a critical incident angle of 41.8°.

The light guide member may include polymethyl methacrylate resin having a critical incident angle of 41.8°.

The light source is installed on at least one longitudinal end of the light guide member.

A pair of light guide members are aligned in opposition to each other while facing the object, in which the light guide members are inclined relative to each other.

The reflective surface is defined by a plurality of reflective grooves having triangular sections.

The reflective surface may be defined by a plurality of reflective grooves having arc-shape sections.

The reflective surface is coated with a white pigment that induces scattered reflection of light.

The light source includes a light emitting diode.

The light emitting diode generates light having a wavelength band of three primary colors including red, green and blue colors.

The light source includes a white light emitting diode, which generates a white color and is obtained by coating a fluorescent material on the light emitting diode generating a blue color.

The light source may include a white light emitting diode, which generates a white color and is obtained by coating a fluorescent material on the light emitting diode generating an ultraviolet ray.

According to another aspect of the present invention, there is provided an image scanning apparatus comprising a scanner module which converts image information into an electric signal by reading the image information from an object. The scanner module comprises a light source generating light to be irradiated onto the object, and a light guide member for guiding the light generated from the light source toward the object. The light guide member has a reflective surface for reflecting the light generated from the light source and a plurality of guide surfaces that reflect the light, which is reflected from the reflective surface, such that the light is guided into the object.

As described above, according to the scanner module and the image scanning apparatus employing the same of the present invention, a plurality of guide surfaces are formed at both sides of the light guide member so that the light, which is reflected from the reflective surface at a relatively small reflection angle or a relatively large reflection angle, can be reflected toward the exit surface of the light guide member by the guide surfaces, so that the light can be prevented from being leaked out of the light guide member, thereby reducing the light loss. Since the light loss can be reduced, a greater amount of light can be irradiated onto the surface of the manuscript. That is, the scanning operation can be performed at a higher speed by using the same light source. If the amount of light is insufficient, noise may increase in the scan image due to inherent and environmental problems, so that the image quality is degraded. However, if a high-power light source is used or power applied to the light source is increased to ensure the sufficient amount of light, the cost, power consumption and heating value of the light source may be increased, resulting in degradation of the light source. Therefore, if the amount of light irradiated onto the surface of the manuscript can be increased by improving the illumination efficiency using a smaller amount of light, the scanning speed of the image scanning apparatus can be improved and the higher effect can be obtained by using a low-power or a low-end device.

In addition, according to the scanner module and the image scanning apparatus employing the same of the present invention, the amount of light radiated from the light guide member can be finely adjusted by controlling the angle of guide surfaces. In order to stably output an image regardless of mechanical vibration and the assembling tolerance, light distribution must be uniformly achieved in the sub-scan direction of the manuscript in a predetermined region of 3 mm to 7 mm depending on an optical system. The profile of the light distribution can be easily adjusted if the user or the designer can freely adjust the direction and location components of the light. The direction and location components of the light may be increased, if the number of guide surfaces of the light guide member is increased. Therefore, the light guide member having a plurality of side angles is very effective to adjust the light distribution.

In addition, since the scanner module and the image scanning apparatus employing the same according to the present invention use a light emitting diode, which is a semiconductor device, as a light source, the amount of light may reach a peak point within 1 μs, so the start-up time of the light source can be remarkably reduced as compared with that of the CCFL which requires the start-up time exceeding 30 seconds. In addition, different from the CCFL, which is driven at several hundreds to thousands of voltages, the light source can be driven at a low voltage, so an inverter used for voltage boosting and AC generation is not required. Thus, the manufacturing cost can be reduced and space utilization can be improved. In addition, since the inverter can be omitted, power consumption can be effectively reduced. Further, different from the CCFL that requires a longer start-up time and an amount of light is reduced as the temperature becomes lowered, the light source of the present invention can ensure a constant amount of light and a stable start-up time regardless of the peripheral temperature condition. In addition, the light source of the present invention can remarkably reduce the amount of the electromagnetic waves, so that noise generated from circuits can be reduced. Further, the light source of the present invention represents relatively higher endurance against impact and pressure as compared with the CCFL made from thin glass, which is easily broken. In addition, different from the CCFL, the light source of the present invention does not use Hg causing the environmental problem, so the light source of the present invention can be called an environmental-friendly light source. Furthermore, the light source of the present invention is more advantageous than the CCFL because the light source of the present invention has a long life span of about hundred thousand hours. In addition, it is possible to effectively adjust light distribution in the width direction of the light guide member without light loss, so the present invention can effectively compensate for the shortage of marginal light in the image forming system.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
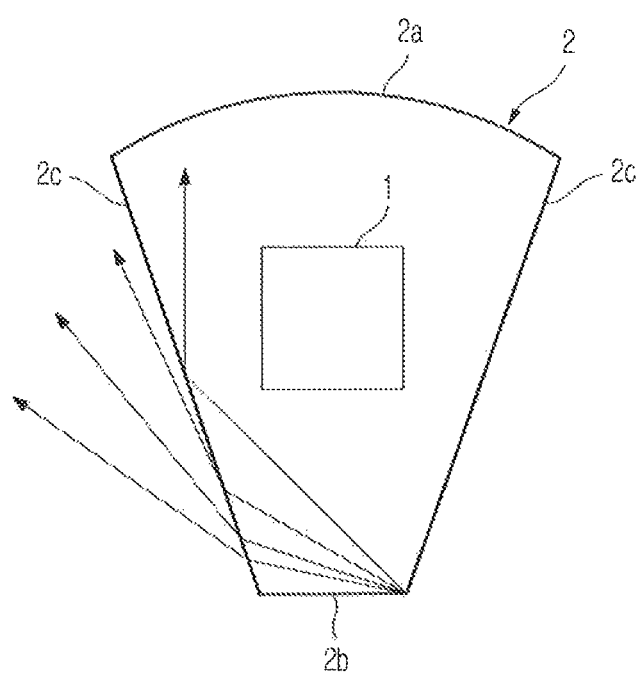
FIG. 1 is a sectional view of a light guide member employed in a conventional image scanning apparatus.
Figure 2:
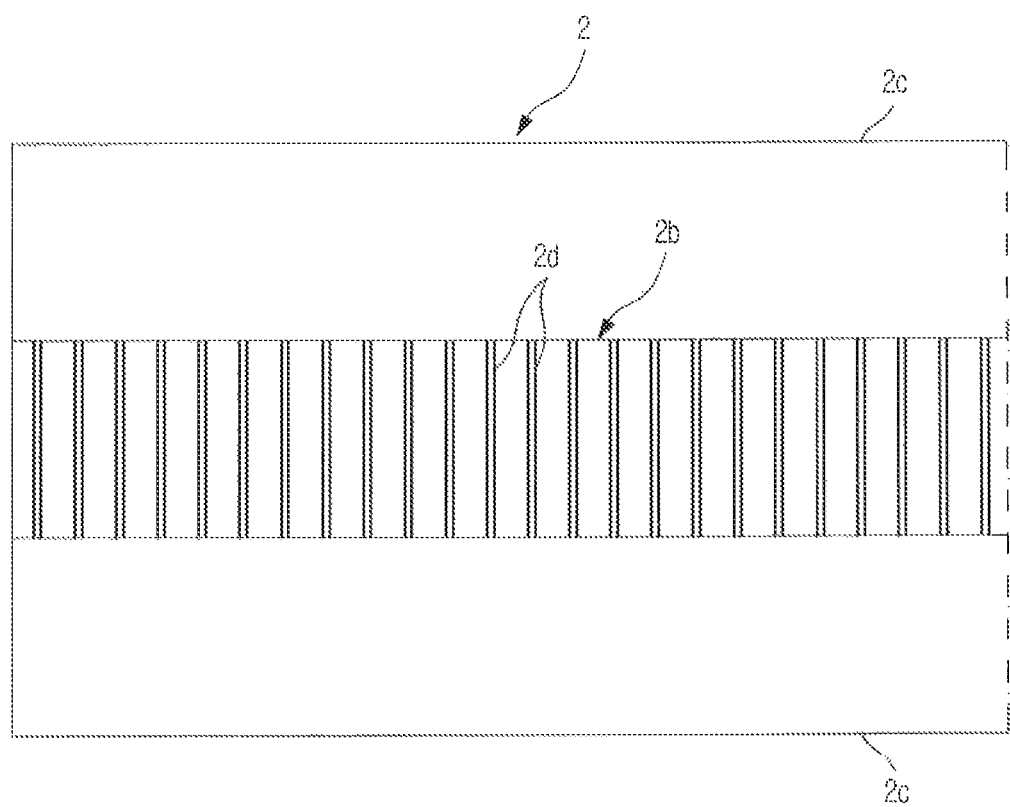
FIG. 2 is a schematic plan view showing a reflective surface of a light guide member employed in a conventional image scanning apparatus.

Reference will now be made in detail to the embodiments of the present invention, examples of which are illustrated in the accompanying drawings, wherein like reference numerals refer to the like elements. The embodiments are described below to explain the present invention by referring to the figures.

Hereinafter, a scanner module having an illumination device and an image scanning apparatus employing the same according to a first embodiment of the present invention will be described in detail with reference to the accompanying drawings.

Figure 4:
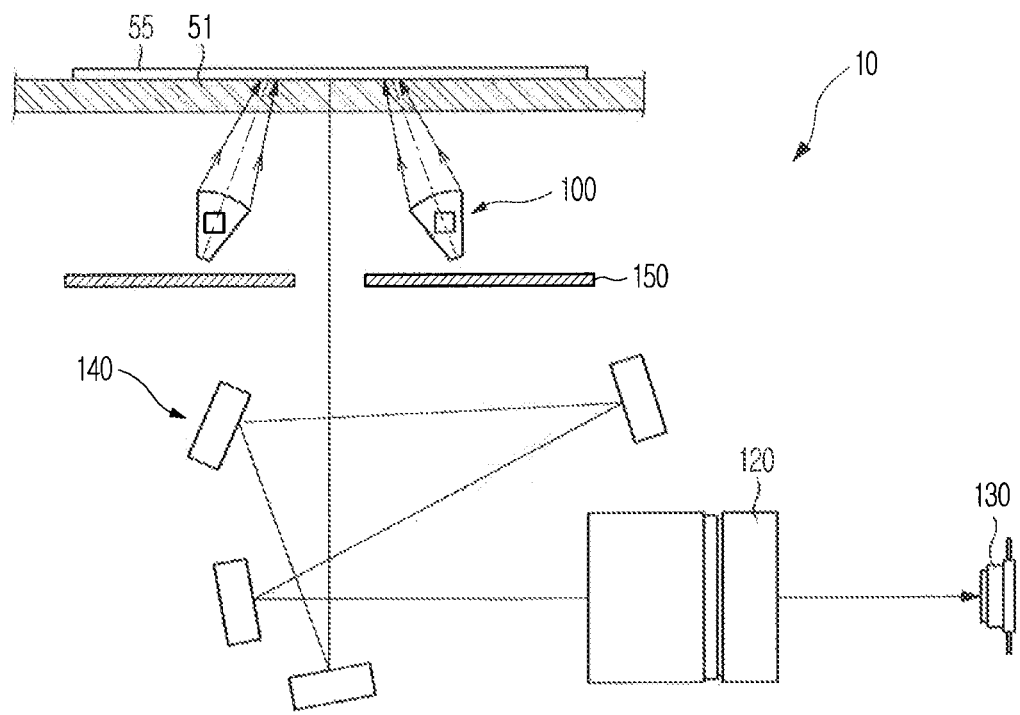
FIG. 4 is a schematic view showing a scanner module employed in an image scanning apparatus according to the present invention.

FIG. 4 shows an optical arrangement of the scanner module 10 according to the first embodiment of the present invention.

Referring to FIG. 4, the scanner module 10 according to the first embodiment of the present invention is an appliance for converting image information into electric signals by reading the image information of an object 55. The scanner module 10 includes an illumination device 100 that radiates light to the object 55 placed on a manuscript board 51, an image sensor 130 that receives the light reflected from the object 55 to convert the light into electric signals, a plurality of reflection mirrors 140 that reflect the light, which is reflected from the object 55, toward the image sensor 130, and a focus lens 120 arranged in front of the image sensor 130 in an optical path such that the light can be focused on the image sensor 130.

Among the above elements of the scanner module 10, the image sensor 130 reads image information of the object 55 based on the light that is focused on the image sensor 130 through the focus lens 120. The image sensor 130 can be variously arranged according to application fields thereof. For instance, the image sensor 130 can be arranged in a single row or in a plurality of rows for color image scanning of red/green/blue or red/green/blue/white-black.

In addition, the reflection mirrors 140 are prepare to provide the optical path in a predetermined space. The reflection mirrors 140 convert the optical path by reflecting the light that is reflected from the object 55. If the scanner module 10 includes plural reflection mirrors 140, the scanner module 10 may have a compact size while ensuring an optical path suitable for focusing an image between the object 55 and the image sensor 120. According to FIG. 4, four reflection mirrors 140 are provided in the present invention. However, the present invention is not limited thereto, and the number of the reflection mirrors 140 can be changed according to applications thereof.

In addition, the scanner module 10 according to the present invention can further includes a light window 150 to control light traveling toward the image sensor 130. The light window 150 is disposed between the illumination device 100 and the reflection mirrors 140 to prevent undesired light from being introduced into the image sensor 130 when the light is reflected from the object 55.

Figure 5:
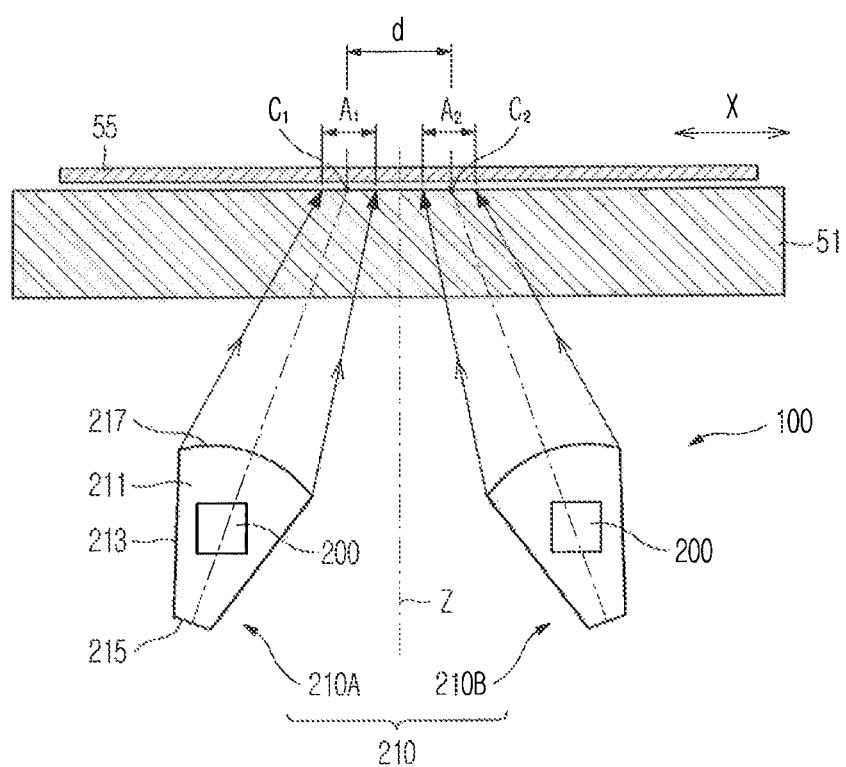
FIG. 5 is a schematic view showing an illumination device employed in an image scanning apparatus according to the present invention.
Figure 6:
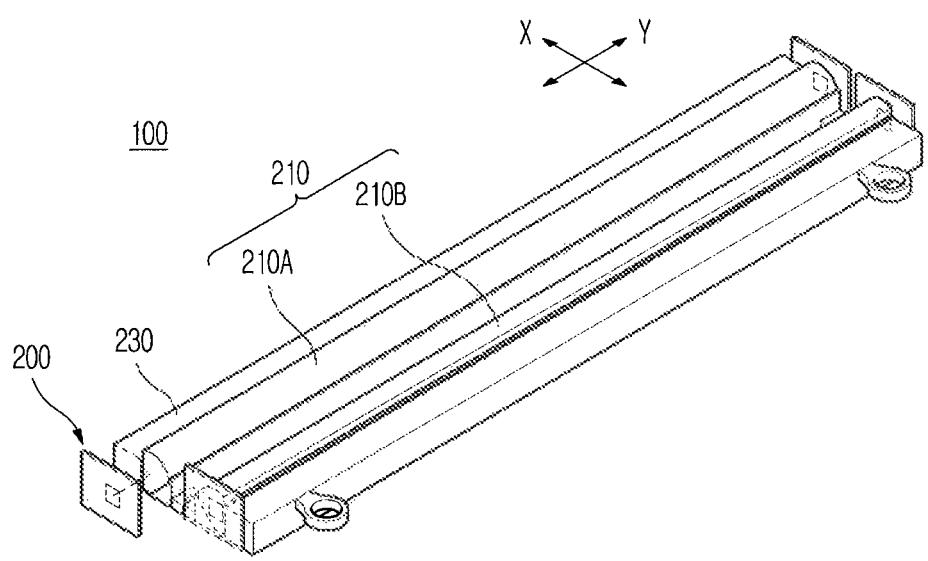
FIG. 6 is a perspective view showing an illumination device employed in an image scanning apparatus according to a first embodiment of the present invention.

FIG. 5 is a schematic view showing an optical arrangement of the illumination device employed in the scanner module 10 according to the embodiment of the present invention, and FIG. 6 is a perspective view showing the illumination device employed in the scanner module 10 according to the first embodiment of the present invention.

Referring to FIGS. 5 and 6, the illumination device 100 is employed in the scanner module 10 to illuminate light onto the manuscript board 51 in the sub-scan direction (Y direction) that is substantially perpendicular to the image scan direction (X direction) of the scanner module 10.

To this end, the illumination device 100 includes a light source 200 for radiating the light, and a light guide unit 210 that guides the light toward the object 55 by diffusing the light generated from the light source 200. The light guide unit 210 includes a pair of light guide members 210A and 210B facing the manuscript board 51 in which the sub-scan direction (Y direction) is the length direction of the light guide unit and the image scan direction (X direction) is the width direction of the light guide unit 210.

The light source 200 includes light emitting diodes capable of emitting light having a wavelength band of three primary colors, that is, red, green and blue. The light emitting diodes used as the light source 200 of the present invention are made from a semiconductor device, so the light emitting diodes can generate the sufficient amount of light within a short period of time as compared with the CCFL or the xenon lamp. Thus, the start-up time of the scanner module 10 can be shortened and power consumption can be reduced. In addition, the light emitting diodes can be obtained without using Hg, so that the light emitting diodes do not cause environmental problems.

Although the present embodiment employs the light emitting diodes capable of emitting light having a wavelength band of three primary colors as the light source 200, the present invention is not limited thereto. For instance, a white light emitting diode, in which a fluorescent material is coated on a light emitting diode generating a blue color or an ultraviolet ray to generate a white color, can be used as the light source 200. Further, various types of point light sources can be used as the light source 200 in addition to the light emitting diode.

The light guide members 210A and 210B convert the optical path of light irradiated from the light source 200 such that the light can be irradiated onto at least two regions $A_1$ and $A_2$. The light guide members 210A and 210B are spaced apart from each other in the image scan direction. For the purpose of convenience, the light guide member 210A provided at one side of the image scan direction will be referred to as a first light guide member and the light guide member 210B provided at the other side of the image scan direction will be referred t as a second light guide member. The centers $C_1$ and $C_2$ of the two regions $A_1$ and $A_2$ are spaced apart from each other in the image scan direction X by a distance d. Therefore, the light can be illuminated onto the center C of the object 55 placed on the manuscript board 51 as well as a predetermine region of the object 55 which deviates from the center C of the object 55.

According to the present embodiment, as shown in FIGS. 5 and 6, the illumination device 100 can illuminate the light onto the first and second regions $A_1$ and $A_2$ and a pair of light guide members 210A and 210B are provided to guide the light onto the first and second regions $A_1$ and $A_2$. In addition, the illumination device 100 may further include a holder 230 for guiding the installation position of the light guide members 210A and 210B when the light guide members 210A and 210B are installed on the optical path.

The light guide members 210A and 210B have rod shapes extending in the sub-scan direction Y and include transparent materials, such as PMMA (polymethyl methacrylate). Each of the light guide members 210A and 210B has an incident surface 211, a guide surface 213, a reflective surface 215 and an exit surface 217.

The light irradiated from the light source 200 is incident into the incident surface 211. The incident surface 211 is formed on at least one longitudinal end portion of the light guide members 210A and 210B and the light source 200 faces the incident surface 211.

Figure 7:
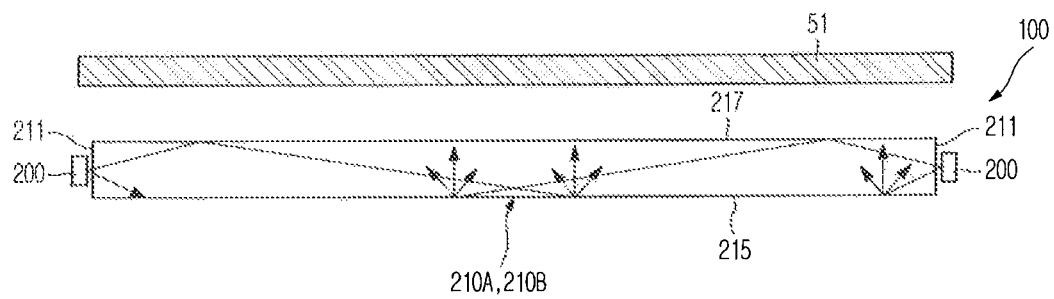
FIG. 7 is a sectional view showing an illumination device employed in an image scanning apparatus according to a first embodiment of the present invention.

For example, FIGS. 6 and 7 show incident surfaces 211 that are formed on both longitudinal end portions of the light guide members 210A and 210B, respectively. In this case, the light sources 200 are provided corresponding to the incident surfaces 211 formed on the both longitudinal end portions of the light guide members 210A and 210B to irradiate light onto the incident surfaces 211, thereby increasing the amount of light.

Meanwhile, when the light guide members 210A and 210B are installed in the holder 230, the light guide members 210A and 210B are slantingly arranged such that the light reflected from the object 55 may not interfere with the light guide members 210A and 210B. That is, as shown in FIG. 5, the central line of light that is output from the light guide members 210A and 210B is inclined relative to a central optical axis Z of the light.

Figure 8:
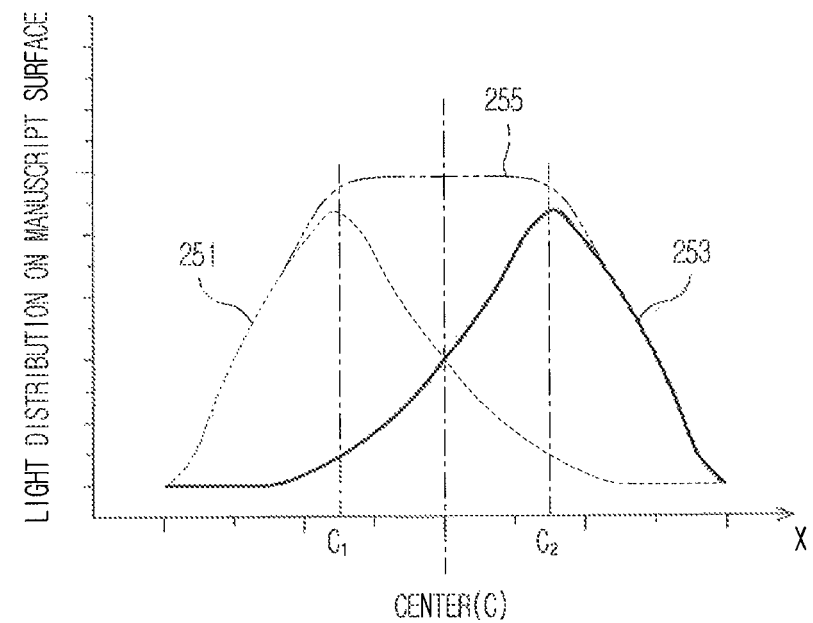
FIG. 8 is a graph showing light distribution on a surface of a manuscript in the width direction of a light guide member employed in an image scanning apparatus according to a first embodiment of the present invention.

FIG. 8 is a graph showing light distribution on a surface of a manuscript in the width direction of the light guide members 210A and 210B when the light source and the light guide members 210A and 210B are arranged as shown in FIG. 5.

Referring to FIG. 8, reference numeral 251 represents a curve showing light distribution on the surface of the manuscript placed on the manuscript board 51 when the light is output from the first light guide member 210A, and reference numeral 253 represents a curve showing light distribution on the manuscript board 51 when the light is output from the second light guide member 210B. In addition, reference numeral 255 represents a curve showing the total light distribution on the manuscript board 51.

Referring to FIG. 5, when the light source 200 and the light guide members 210A and 210B are prepared according to the embodiment of the present invention, the amount of light irradiated onto the manuscript board 51 is maximized at the center $C_1$ of the first region $A_1$ and at the center $C_2$ of the second region $A_2$. As mentioned above, the center $C_1$ of the first region $A_1$ is spaced apart from the center $C_2$ of the second region $A_2$ by the distance d. Referring to the curve 255 that is the sum of the curves 251 and 253, the amount of light irradiated onto the first and second regions $A_1$ and $A_2$ is substantially constant in the region between the center $C_1$ of the first region $A_1$ and the center $C_2$ of the second region $A_2$.

The illumination device 100 having the above structure can illuminate light over the relatively large region of the manuscript as compared with the conventional illumination device. Thus, the illumination device 100 can be employed in the scanner module 10 capable of performing color scanning operation, and the optical elements constituting the scanner module 10 may have a relatively large assembling tolerance, so that productivity of the scanner module 10 can be improved.

The scanner module 10 according to the embodiment of the present invention employs the illumination device 100 capable of illuminating light over the relatively large region of the manuscript, so that the output value of the image sensor 130 can be constantly maintained regardless of the assembling tolerance of the reflection mirrors 140 and the focus lens 120.

The exit surface 217 faces the manuscript board 51. The light that is diffused and reflected by the reflective surface 215 and the guide surface 213 can be output through the exit surface 217. The exit surface 217 may have a function of a condenser lens. In this case, the light irradiated toward the manuscript board 51 is focused on the manuscript board 51, so that light having Gaussian distribution can be illuminated on the first region $A_1$. According to the present embodiment, as shown in FIG. 5, the exit surface 217 is prepared in the form of a convex lens having an arc-shape section with a predetermined curvature.

The reflective surface 215 is disposed in opposition to the exit surface 217 to diffuse and reflect the light incident through the incident surface 211, thereby allowing the light to be uniformly output through the entire surface of the exit surface 217. To this end, the light is preferably subject to scattered reflection over the whole area of the reflective surface 215.

Figure 9:
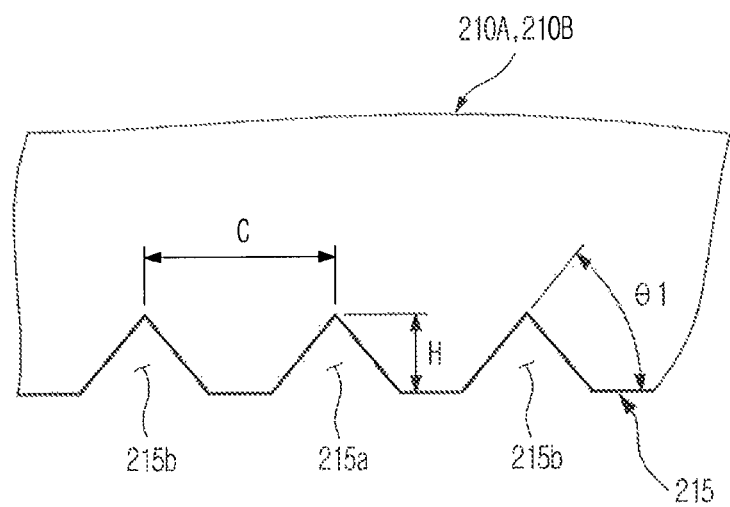
FIG. 9 is a sectional view of a reflective surface of a light guide member employed in an image scanning apparatus according to a first embodiment of the present invention.

According to the present embodiment, as shown in FIG. 9, the reflective surface 215 is formed with a plurality of reflective grooves 215a and 215b so that the light irradiated from the light source 200 can be subject to the scattered reflection. The reflective grooves 215a and 215b have triangular sectional shapes to easily guide the light, which is irradiated from the light source 200 at longitudinal end portions of the light guide members 210A and 210B, toward the exit surface of the light guide members 210A and 210B. The amount of light reflected toward the exit surface of the light guide members 210A and 210B by the reflective grooves 215a and 215b may increase proportionally to the height H of the triangular section of the reflective grooves 215a and 215b and the inclination angle θ1 of the lateral side of the triangular section. Therefore, the amount of light irradiated from the light guide members 210A and 210B can be finely adjusted by properly adjusting the height H and the inclination angle θ1 of the triangular section of the reflective grooves 215a and 215b.

Although the present embodiment has been described in that the reflective grooves 215a and 215b formed in the reflective surface 215 have the triangular section, the present invention is not limited thereto. For instance, the reflective grooves 215a and 215b may have arc-shaped sections or rectangular-shaped sections.

Figure 10:
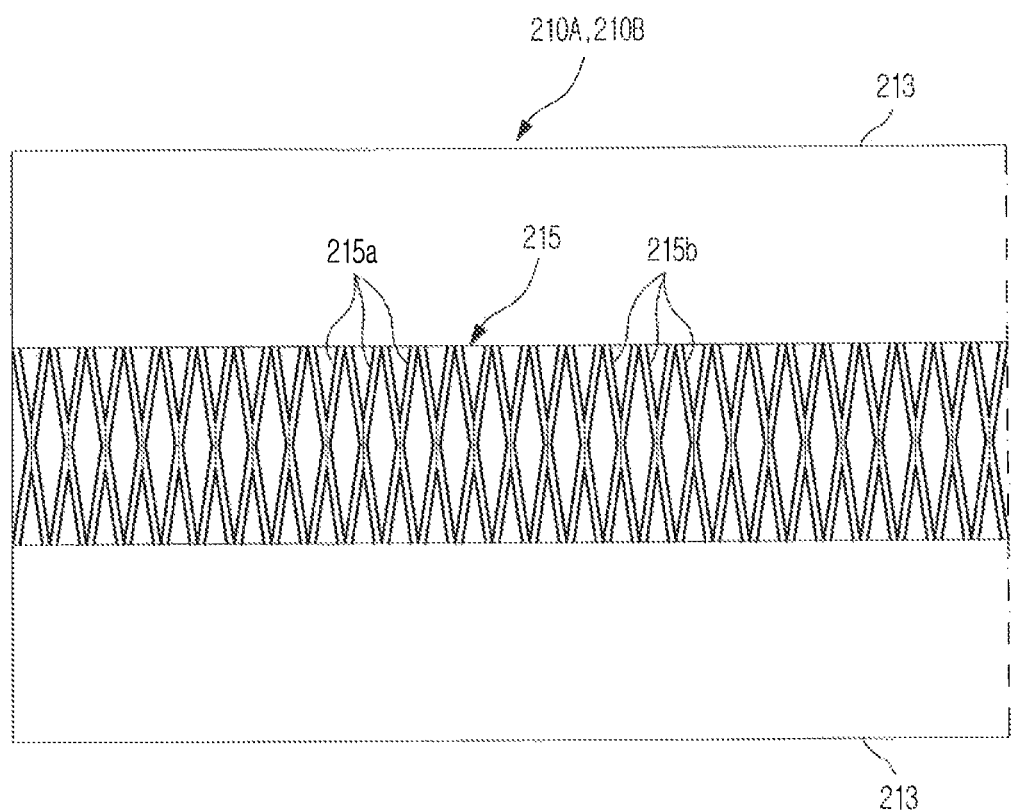
FIG. 10 is a schematic plan view of a reflective surface of a light guide member employed in an image scanning apparatus according to a first embodiment of the present invention.

In addition, as shown in FIG. 10, the reflective surface 215 of the light guide members 210A and 210B employed in the image scanning apparatus according to the present invention can be formed with first and second reflective grooves 215a and 215h, which are symmetrically formed while being inclined widthwise along the light guide members 210A and 210B. According to the present embodiment, the first and second reflective grooves 215a and 215b may cross each other on the reflective surface 215.

If the first and second reflective grooves 215a and 215b are symmetrically formed on the reflective surface 215 of the light guide members 210A and 210B while being inclined widthwise along the light guide members 210A and 210B, the light irradiated from the light source 200 can be guided toward the exit surface of the light guide members 210A and 210B while being diffused in the lateral direction by the first and second reflective grooves 215a and 215b, so that the light can be uniformly distributed in the width direction of the light guide members 210A and 210B when the light is irradiated from the longitudinal end portions of the light guide members 210A and 210B. As can be understood from the above, the amount of light diffused in the width direction of the light guide members 210A and 210B may increase proportionally to the inclination angle of the first and second reflective grooves 215a and 215b.

Figure 11:
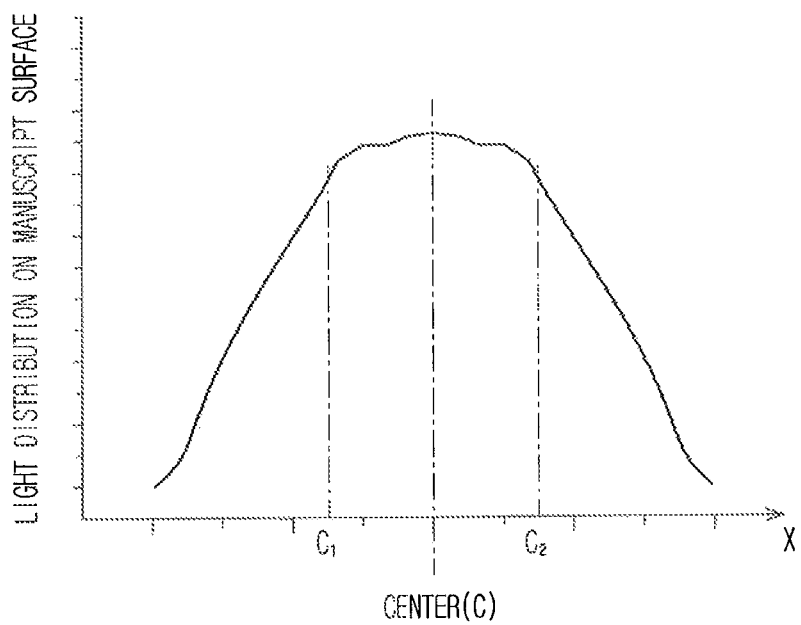
FIG. 11 is a graph showing light distribution on a surface of a manuscript in the width direction of a light guide member employed in an image scanning apparatus according to a first embodiment of the present invention.

FIG. 11 is a graph showing light distribution on a surface of a manuscript in the width direction of the light guide members 210A and 210B having the first and second reflective grooves 215a and 215b, which are symmetrically formed while being inclined widthwise along the light guide members 210A and 210B, when the light irradiated from the longitudinal end portions of the light guide members 210A and 210B is emitted through the exit surface 217.

Figure 3:
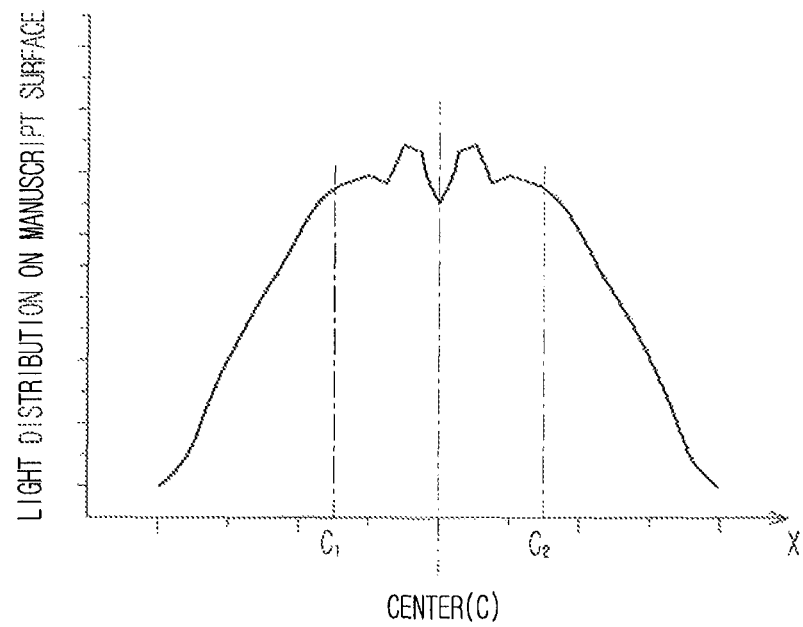
FIG. 3 is a graph showing light distribution in the width direction of a light guide member when light is radiated from both longitudinal ends of the light guide member employed in a conventional image scanning apparatus.

When comparing FIG. 11 with FIG. 3, the light guide members 210A and 210B having the first and second reflective grooves 215a and 215b, which are symmetrically formed while being inclined widthwise along the light guide members 210A and 210B, can effectively diffuse the light in the width direction of the light guide members 210A and 210B than the conventional light guide member 1 having a plurality of reflective grooves 1d, which are formed in parallel to each other, so that the light guide members 210A and 210B can represent uniform light distribution on the surface of the manuscript.

Although the present embodiment has been described in that the reflective surface 215 is formed with plural reflective grooves 215a and 215b to allow the light to be subject to scattered reflection, the present invention is not limited thereto. For instance, the reflective surface 215 may have a micro lens shape or a cylindrical shape. If the reflective surface 215 has the above shape, the reflective surface 215 can scatter the incident light, so that the light can be uniformly output through the exit surface 217. In addition, a light diffusion material, such as a white pigment, can be coated on the reflective surface 215 such that light can be uniformly irradiated.

Referring again to FIG. 5, the guide surface 213 is formed at both longitudinal end portions of the light guide members 210A and 210b in order to guide the incident light, which is incident into the incident surface 211, such that the incident light can be irradiated through the whole area of the exit surface 217 by internal total reflection.

Figure 12:
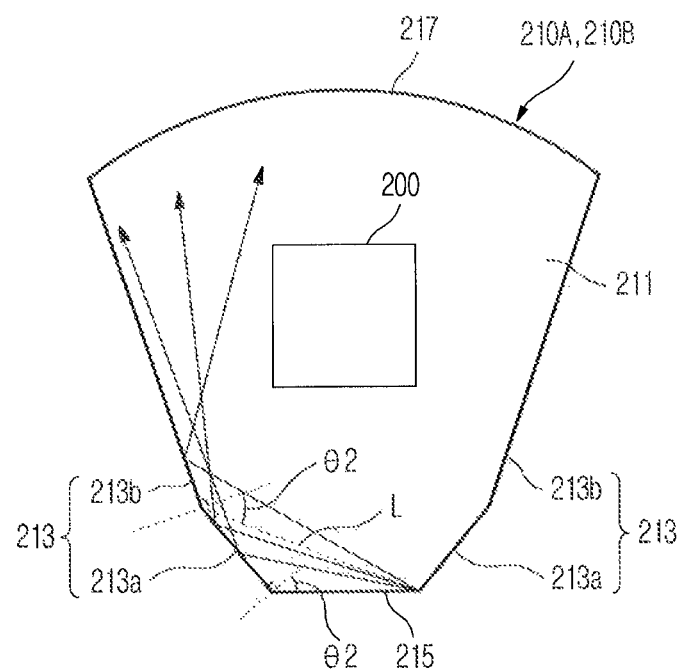
FIG. 12 is a sectional view showing a light guide member employed in an image scanning apparatus according to a first embodiment of the present invention.

As shown in FIG. 12, a plurality of guide surfaces 213 are symmetrically formed at both sides of the light guide members 210A and 210b to reflect all the light, which is reflected from the reflective surface 215 at various reflection angles, toward the exit surface of the light guide members 210A and 210b. If the plural guide surfaces 213 are symmetrically formed at both sides of the light guide members 210A and 210b, most of the light reflected from the reflective surface 215 is guided toward the exit surface of the light guide members 210A and 210b while being reflected by the guide surfaces 213, so that the amount of light leaked out of the light guide members 210A and 210b through the guide surfaces 213 can be remarkably reduced. In addition, the light reflected from the reflective surface 215 is reflected again by the guide surfaces 213, the guide surfaces 213 may serve as a virtual light source together with the reflective surface 215. Therefore, the light distribution on the surface of the manuscript can be finely adjusted by properly adjusting the angle of guide surfaces 213 when the light is irradiated through the exit surface of the light guide members 210A and 210b.

According to the present invention, the guide surfaces 213 includes a first guide surface 213a, which extends from both sides of the reflective surface 215 while forming an obtuse angle relative to the reflective surface 215, and a second guide surface 213b, which extends from an end of the first guide surface 213e while forming an obtuse angle relative to the first guide surface 213a.

If the first and second guide surfaces 213a and 213b are formed at both sides of the light guide members 210A and 210b, the light reflected from the reflective surface 215 at a relatively large reflection angle can be reflected toward the exit surface of the light guide members 210A and 210b by the first guide surface 213a, and the light reflected from the reflective surface 215 at a relatively small reflection angle can be reflected toward the exit surface of the light guide members 210A and 210b by the second guide surface 213b, so that the amount of light leaked out of the light guide members 210A and 210b can be reduced.

In order to minimize the light loss, the incident angle of the light, which is incident into the first and second guide surfaces 213a and 213b while being reflected from the reflective surface 215, must be greater than a critical incident angle θ2 that ensures total reflection of the light.

Therefore, preferably, the angle between the reflective surface 215 and the first guide surface 213a must be equal to or greater than the sum of the critical incident angle θ2 that ensures total reflection of the light and an angle of 90°. In addition, the angle between the first guide surface 213a and the second guide surface 213b must be designed such that the incident angle of the light, which is incident into the second guide surface 213b while being reflected from the reflective surface 215, can be equal to or greater than the critical incident angle θ2. At this time, since the minimum incident angle of the light, which is incident into the second guide surface 213b formed at one side of the light guide members 210A and 210B, may correspond to an angle between a virtual line L and the second guide surface 213b formed at one side of the light guide members 210A and 210B, in which the virtual line L extends from an edge serving as a boundary between the reflective surface 215 and the second guide surface 213b formed at the other side of the light guide members 210A and 210B to an edge serving as a boundary between the first guide surface 213a and the second guide surface 213b formed at one side of the light guide members 210A and 210B, the angle between the virtual line L and the second guide surface 213b formed at one side of the light guide members 210A and 210B is preferably equal to or greater than the sum of the critical incident angle θ2 and an angle of 90°.

As described above, according to the present embodiment, the light guide members 210A and 210B may include polymethyl methacrylate. In the case of polymethyl methacrylate, the critical incident angle θ2 of the light is 41.8°. Therefore, the angle between the reflective surface 215 and the first guide surface 213a and the angle between the virtual line L and the second guide surface 213b are equal to or greater than 131.8° respectively.

According to the first embodiment of the present invention, although the angle between the reflective surface 215 and the first guide surface 213a, and the angle between the virtual line L and the second guide surface 213b are equal to or greater than the sum of the critical incident angle θ2 and an angle of 90°, since the light is subject to Lambertian reflection at the reflective surface 215, the amount of light incident into the first guide surface 213a is substantially very small. Thus, the amount of light rarely depends on the angle between the reflective surface 215 and the first guide surface 213a. Therefore, it is possible to set the angle between the virtual line L and the second guide surface 213b greater than the sum of the critical incident angle θ2 and an angle of 90°.

According to the present embodiment, the light guide members 210A and 210B include polymethyl methacrylate. However, the present invention is not limited thereto. For instance, the light guide members 210A and 210B may include colorless transparent resin, such as polystyrene, in addition to transparent acryl-based resin, such as polymethyl methacrylate. The critical incident angle according to the type of resins can be calculated through Snell's law.

Figure 13:
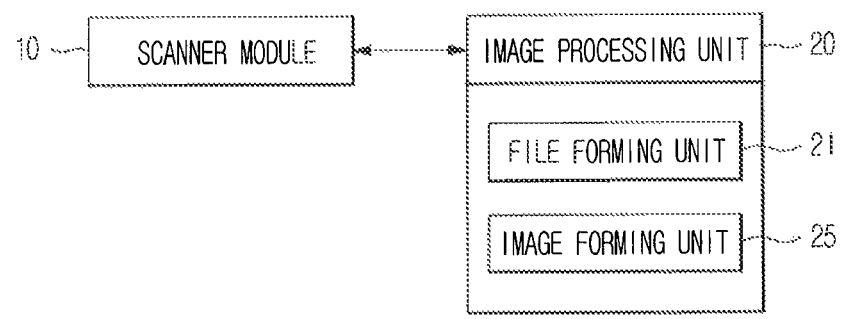
FIG. 13 is a block diagram of an image scanning apparatus according to the present invention.

FIG. 13 is a block diagram of the image scanning apparatus according to the embodiment of the present invention.

Referring to FIG. 13, the image scanning apparatus according to the embodiment of the present invention includes the scanner module 10 and an image processing unit 20 which processes the image obtained from the scanner module 10. The image scanning apparatus of the present invention may include an MFP (multi-function printer), a digital copy machine, or a scanner.

The scanner module 10 has already been described in the previous embodiment, so the detailed description thereof will be omitted in order to avoid redundancy.

The image processing unit 20 includes at least one of a file forming unit 21 for forming an image file based on the image obtained from the image sensor of the scanner module 10 and an image forming unit 25 for forming an image on a printing medium based on the image obtained from the image sensor.

Accordingly, if the image scanning apparatus employs the scanner module 10 having the illumination device 100 described above, the image sensors aligned in a plurality of rows can output uniform values even if the position of optical elements, such as reflection mirrors, is changed by various external parameters.

Figure 14:
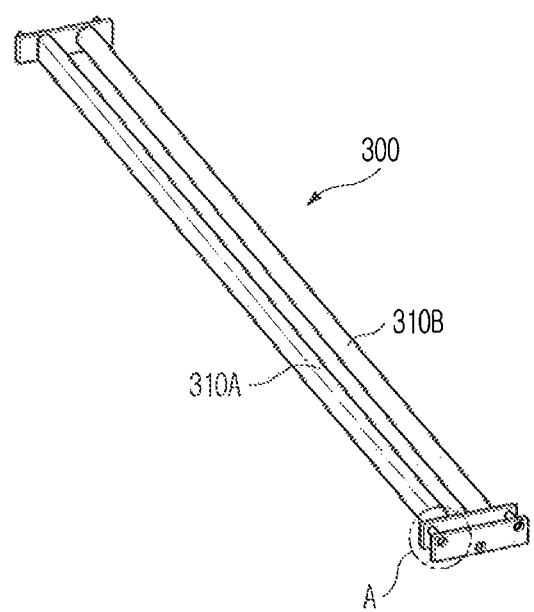
FIG. 14 is a perspective view showing an illumination device employed in an image scanning apparatus according to a second embodiment of the present invention.
Figure 15:
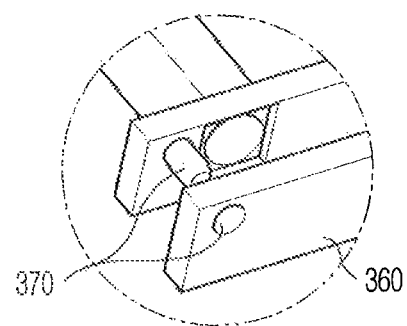
FIG. 15 is an enlarged perspective view of "A" shown in FIG. 14.

Although FIG. 6 shows the light guide members 210A and 210B, which are connected to each other through the holder 230, the present invention is not limited thereto. For instance, according to the second embodiment of the present invention, as shown in FIG. 14, a pair of light guide members 310A and 310B can be fabricated as a single mold product. Referring to FIG. 14, both ends of the light guide member 310A are connected to both ends of the light guide member 310B. In this case, the light guide members 310A and 310B are integrally fabricated through an injection molding process and simultaneously assembled regardless of the assembling tolerance thereof. Thus, the assembling process can be simplified and the manufacturing cost can be reduced. In addition, a light source, which irradiates light toward the light guide members 310A and 310B, can be integrally formed with a single substrate 360. In addition, as shown in FIG. 15, a coupling structure 370 can be provided between the signal substrate 360 and the light guide members 310A and 310B to improve assembling work for the illumination device 100.

Figure 16:
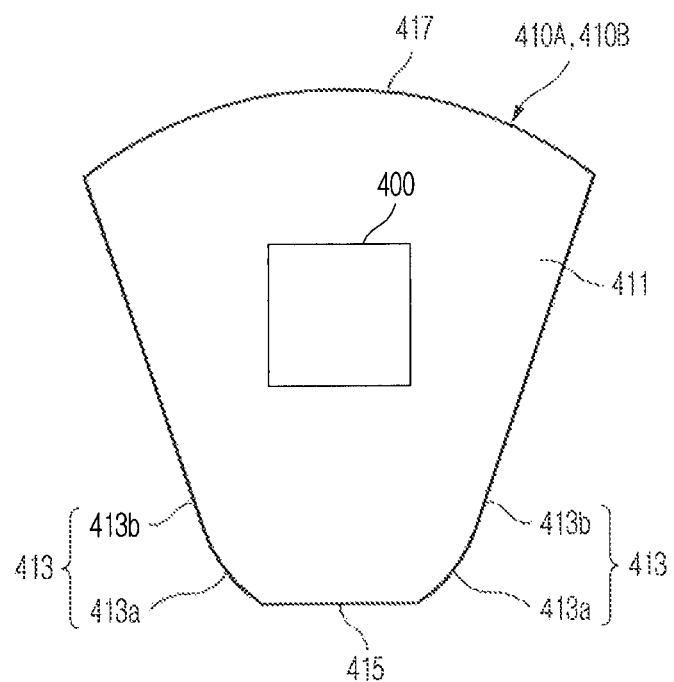
FIG. 16 is a sectional view of a light guide member employed in an image scanning apparatus according to a third embodiment of the present invention.

Although FIG. 12 shows the first and second guide surfaces 213a and 213b having the linear sectional shapes, the present invention is not limited thereto. For instance, according to the third embodiment of the present invention, as shown in FIG. 16, a first guide surface 413a of light guide members 410A and 410B may have a curved shape and a second guide surface 413b of the light guide members 410A and 410B may have a linear sectional shape without degrading the effect of the present invention.

Figure 17:
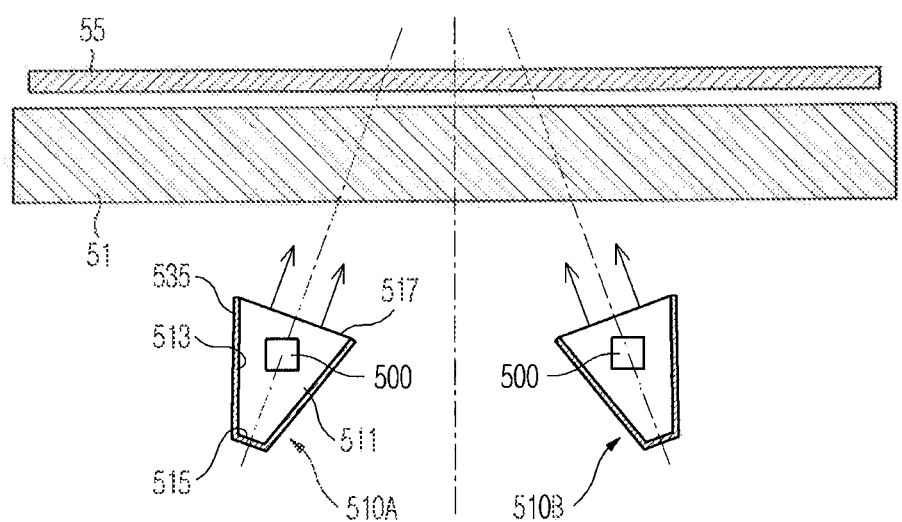
FIG. 17 is a schematic view of an illumination device employed in an image scanning apparatus according to a fourth embodiment of the present invention.

In addition, referring to FIG. 5, the scattered reflection may occur only at the reflective surface 211 of the light guide members 210A and 210B. However, the present invention is not limited thereto. For instance, according to the fourth embodiment of the present invention, as shown in FIG. 17, a reflective member 535 is formed on at least one of a reflective surface 515 and a guide surface 513 of light guide members 510A and 510B. Referring to FIG. 17, the reflective member 535 is formed on the guide surface 513 and the reflective surface 515, respectively. The reflective member 535 can be obtained by coating or printing the guide surface 513 or the reflective surface 515 with a material having high reflectivity of about 90% or more in the wavelength band of the light irradiated from a light source 500. The material having high reflectivity is generally known in the art, so the detailed description thereof will be omitted.

In addition, although FIG. 5 shows the exit surface 217 in the form of the convex lens having the arc-shaped section, the present invention is not limited thereto. For instance, as shown in FIG. 17, the exit surface may be prepared in the form of a flat lens having a plane shape or a Fresnel lens pattern.

Figure 18:
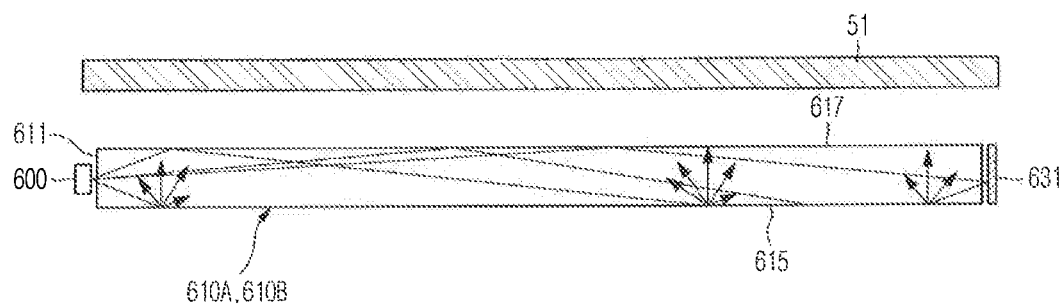
FIG. 18 is a sectional view of an illumination device employed in an image scanning apparatus according to a fifth embodiment of the present invention.

Although FIG. 7 shows the incident surface 211 formed at both longitudinal end portions of the light guide members 210A and 210B, the present invention is not limited thereto. For instance, according to the fifth embodiment of the present invention, as shown in FIG. 18, a light source 600 is installed only at one longitudinal end portion of light guide members 610A and 610B, so that an incident surface 611 is exclusively formed on one longitudinal end portion of light guide members 610A and 610B. In this case, a reflective plate 631 is provided at the other longitudinal end portion of light guide members 610A and 610B. Thus, the light incident through the incident surface 611 or the reflective surface 615 is reflected into the light guide members 610A and 610B, thereby preventing the light irradiated from the light source 600 from being output through other surfaces.

Figure 19:
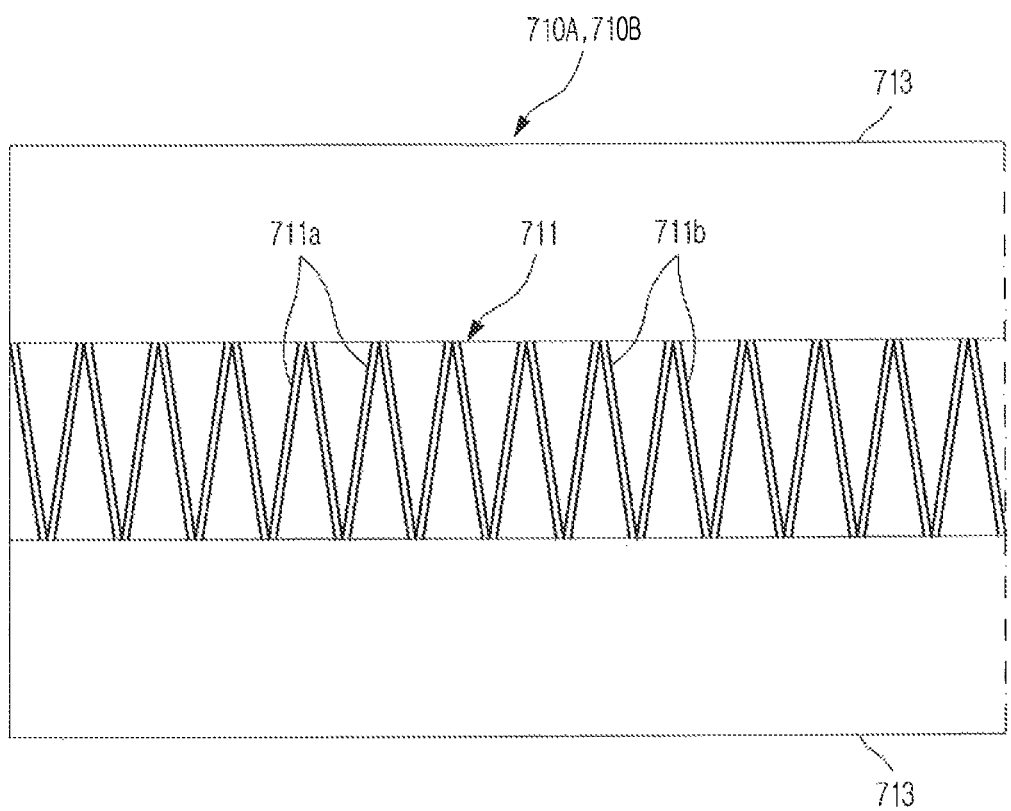
FIG. 19 is a plan view of a light guide member employed in an image scanning apparatus according to a sixth embodiment of the present invention.

In addition, although FIG. 10 shows the first and second reflective grooves 215a and 215b that cross each other to facilitate processing work, the present invention is not limited thereto. For instance, according to the sixth embodiment of the present invention, as shown in FIG. 19, first and second reflective grooves 711a and 711b of a reflective surface 711 may not cross each other, but they are alternately aligned lengthwise along light guide members 710A and 710B. In this case, the same effect can be achieved.

Figure 20:
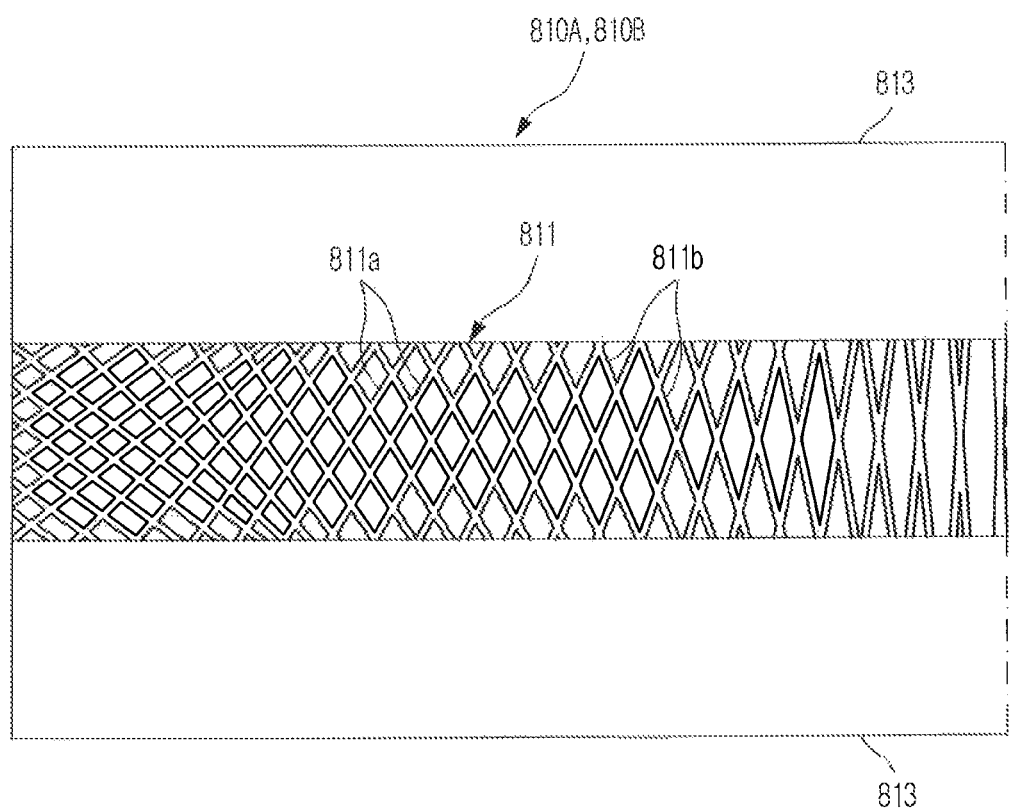
FIG. 20 is a plan view of a light guide member employed in an image scanning apparatus according to a seventh embodiment of the present invention.

The light distribution on the surface of the manuscript may not be uniform in the width direction of the light guide members 210A and 210B at the longitudinal end portions of the light guide members 210A and 2108. For this reason, according to the first embodiment of the present invention, the first and second reflective grooves 215a and 215b have the same inclination angle. However, the present invention is not limited thereto. For instance, according to the seventh embodiment of the present invention, as shown in FIG. 20, the inclination angle of first and second reflective grooves 811a and 811b formed in a reflective surface 811 may gradually increase from the center to the both ends of light guide members 810A and 810B. In this case, light can be effectively diffused at the both ends of the light guide members 810A and 810B than the center portion of the light guide members 810A and 810B.

In addition, the amount of light radiated from the both longitudinal ends of the light guide members 810A and 810B may increase proportionally to the inclination angle of the first and second reflective grooves 811a and 811b formed in the light guide members 810A and 810B. Therefore, if the inclination angle of the first and second reflective grooves 811a and 811b is gradually increased from the center to the both ends of light guide members 810A and 810B as realized in the seventh embodiment of the present invention, the amount of light irradiated onto the object 55 from the both longitudinal ends of the light guide members 810A and 810B may increase. Thus, there is great difference between the amount of light irradiated onto the object 55 from the center of the light guide members 810A and 8108 and the amount of light irradiated onto the object 55 from the both longitudinal ends of the light guide members 810A and 810B.

Figure 21:
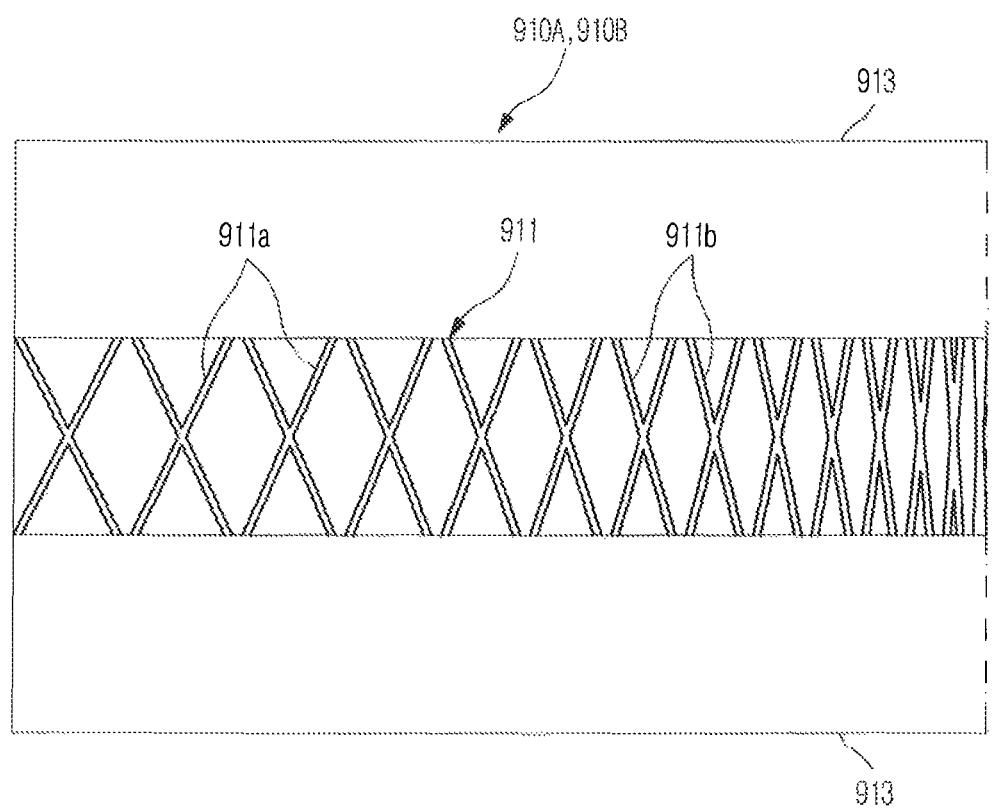
FIG. 21 is a plan view of a light guide member employed in an image scanning apparatus according to an eighth embodiment of the present invention.

In order to solve the above problem, according to the eighth embodiment of the present invention, as shown in FIG. 21, the inclination angle of first and second reflective grooves 911a and 911b gradually increases from the center to the both ends of light guide members 910A and 910B, at the same time, an interval between the first and second reflective grooves 911a and 911b increases proportionally to the inclination angle of the first and second reflective grooves 911a and 911b. In this case, the amount of light radiated onto the object from the both longitudinal ends of the light guide members 910A and 910B can be reduced, so the difference between the amount of light irradiated onto the object 55 from the center of the light guide members 910A and 910B and the amount of light irradiated onto the object 55 from the both longitudinal ends of the light guide members 910A and 910B can be reduced.

The above embodiments have been described in relation to a CCDM, in which the light source and the plural reflection mirrors are integrated in a single module, the present invention can be applied to an MMT (mirror moving type), in which one light source and one reflection mirror are integrated in a single module and two reflection mirrors are integrated in another single module such that the modules including the mirrors can read the image while moving along the object.

Although few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A scanner module movably mounted below a document bed comprising:
   a light source to generate light to be irradiated onto an object;
   a light guide member to guide the light generated from the light source toward the object;
   a sensor configured to detect the light reflected by the object;
   at least one reflecting mirror to reflect the light reflected by the object in a horizontal direction to guide the light to the sensor; and
   a focusing lens disposed between the at least one reflecting mirror and the sensor to focus the reflected light redirected by the at least one reflecting mirror on the sensor, and
   wherein the light guide member comprises:
      an incident surface through which the light generated by the light source is received;
      a reflective surface provided with a plurality of reflective linear elements extending in a widthwise direction of the reflective surface to reflect the light received through the incident surface;
      a plurality of guide surfaces to guide the light received through the incident surface; and
      an exit surface opposite to the reflective surface to allow light reflected by the reflective surface to exit,
   wherein the reflective surface is defined by a plurality of first reflective grooves and a plurality of second reflective grooves and,
   wherein an inclination angle of the first and second reflective grooves with respect to the widthwise direction of the light guide member are gradually increased from a center to both longitudinal ends of the light guide member.

2. The scanner module as claimed in claim 1, wherein the guide surfaces include a pair of first guide surfaces which are inclined from the both ends of the reflective surface while forming an obtuse angle relative to the reflective surface, and a pair of second guide surfaces which are inclined from end portions of the first guide surfaces while forming an obtuse angle relative to the first guide surfaces.

3. The scanner module of claim 2, wherein an angle between the first and second guide surfaces is designed such that an incident angle of the light, which is incident into the second guide surface while being reflected from the reflective surface, is equal to or greater than a critical incident angle.

4. The scanner module of claim 1, wherein the light source is installed on at least one longitudinal end of the light guide member.

5. The scanner module of claim 1, wherein a pair of light guide members are aligned in opposition to each other while facing the object, in which the light guide members are inclined relative to each other.

6. The scanner module of claim 1, wherein at least some of the plurality of reflective grooves having triangular sections.

7. The scanner module of claim 1, wherein at least some of the plurality of reflective grooves having arc-shape sections.

8. The scanner module of claim 1, wherein the reflective surface is coated with a white pigment that induces scattered reflection of light.

9. The scanner module of claim 1, wherein the light source includes a light emitting diode.

10. The scanner module as claimed in claim 1, wherein an interval between a first reflective linear element and a second reflective linear element of the plurality of reflective linear elements adjacent to one of longitudinal ends of the light guide member is greater than an interval between a third reflective linear element and a fourth reflective linear element of the plurality of the reflective linear elements at the center region of the light guide member.

11. The scanner module as claimed in claim 10, wherein a surface area of the exit surface is greater than a surface area of the reflective surface.

12. The scanner module as claimed in claim 1, wherein an interval between the first and second reflective grooves increases proportionally to the inclination angle of the first and second reflective grooves.

13. A scanner module movably mounted below a document bed comprising:
- a light source to generate light to be irradiated onto an object;
- a light guide member to guide the light generated from the light source toward the object;
- a sensor configured to detect the light reflected by the object;
- at least one reflecting mirror to reflect the light reflected by the object in a horizontal direction to guide the light to the sensor; and
- a focusing lens disposed between the at least one reflecting mirror and the sensor to focus the reflected light redirected by the at least one reflecting mirror on the sensor, and
- wherein the light guide member comprises:
  - an incident surface through which the light generated by the light source is received;
  - a reflective surface provided with a plurality of reflective linear elements extending in a widthwise direction of the reflective surface to reflect the light received through the incident surface;
  - a plurality of guide surfaces to guide the light received through the incident surface; and
  - an exit surface opposite to the reflective surface to allow light reflected by the reflective surface to exit,
- wherein an interval between immediately adjacent located reflective linear elements increases from a center of the light guide member towards the incident surface, and wherein the exit surface is provided as a convex lens having an arc-shaped section with a predetermined curvature,
- wherein the guide surfaces include a pair of first guide surfaces which are inclined from both ends of the reflective surface while forming an obtuse angle relative to the reflective surface, and a pair of second guide surfaces which are inclined from end portions of the first guide surfaces while forming an obtuse angle relative to the first guide surfaces, wherein an angle between the reflective surface and the first guide surface is equal to or greater than a sum of a critical incident angle ensuring total reflection of light and an angle of 90°.

14. A scanner module movably mounted below a document bed comprising:
- a light source to generate light to be irradiated onto an object;
- a light guide member to guide the light generated from the light source toward the object;
- a sensor configured to detect the light reflected by the object;
- at least one reflecting mirror to reflect the light reflected by the object in a horizontal direction to guide the light to the sensor; and
- a focusing lens disposed between the at least one reflecting mirror and the sensor to focus the reflected light redirected by the at least one reflecting mirror on the sensor, and
- wherein the light guide member comprises:
  - an incident surface through which the light generated by the light source is received;
  - a reflective surface provided with a plurality of reflective linear elements extending in a widthwise direction of the reflective surface to reflect the light received through the incident surface;
  - a plurality of guide surfaces to guide the light received through the incident surface; and
  - an exit surface opposite to the reflective surface to allow light reflected by the reflective surface to exit,
- wherein an interval between immediately adjacent located reflective linear elements increases from a center of the light guide member towards the incident surface,
- wherein the exit surface is provided as a convex lens having an arc-shaped section with a predetermined curvature,
- wherein the guide surfaces include a pair of first guide surfaces which are inclined from both ends of the reflective surface while forming an obtuse angle relative to the reflective surface, and a pair of second guide surfaces which are inclined from end portions of the first guide surfaces while forming an obtuse angle relative to the first guide surfaces,
- wherein an angle between the first and second guide surfaces is designed such that an incident angle of the light, which is incident into the second guide surface while being reflected from the reflective surface, is equal to or greater than a critical incident angle, and
- wherein an angle between the second guide surface formed on one side of the light guide member and a predetermined virtual line is equal to or greater than a sum of the critical incident angle and an angle of 90°, in which the virtual line extends from an edge serving as a boundary between the reflective surface and the second guide surface formed at the other side of the light guide member to an edge serving as a boundary between the first guide surface and the second guide surface formed at one side of the light guide member.

15. A scanner module movably mounted below a document bed comprising:
- a light source to generate light to be irradiated onto an object;
- a light guide member to guide the light generated from the light source toward the object;
- a sensor configured to detect the light reflected by the object;
- at least one reflecting mirror to reflect the light reflected by the object in a horizontal direction to guide the light to the sensor; and
- a focusing lens disposed between the at least one reflecting mirror and the sensor to focus the reflected light redirected by the at least one reflecting mirror on the sensor, and
- wherein the light guide member comprises:
  - an incident surface through which the light generated by the light source is received;

a reflective surface provided with a plurality of reflective linear elements extending in a widthwise direction of the reflective surface to reflect the light received through the incident surface;

a plurality of guide surfaces to guide the light received through the incident surface; and an exit surface opposite to the reflective surface to allow light reflected by the reflective surface to exit, wherein an interval between immediately adjacent located reflective linear elements increases from a center of the light guide member towards the incident surface, and wherein the exit surface is provided as a convex lens having an arc-shaped section with a predetermined curvature, wherein an interval between immediately adjacent located reflective linear elements increases from a center of the light guide member towards the incident surface, and wherein the exit surface is provided as a convex lens having an arc-shaped section with a predetermined curvature, wherein the guide surfaces include a pair of first guide surfaces which are inclined from both ends of the reflective surface while forming an obtuse angle relative to the reflective surface, and a pair of second guide surfaces which are inclined from end portions of the first guide surfaces while forming an obtuse angle relative to the first guide surfaces, wherein an angle between the reflective surface and the first guide surface is equal to or greater than a sum of a critical incident angle ensuring total reflection of light and an angle of 90°, and wherein the light guide member includes polymethyl methacrylate resin having a critical incident angle of 41.8°.

16. A scanner module movably mounted below a document bed comprising:

a light source to generate light to be irradiated onto an object;

a light guide member to guide the light generated from the light source toward the object;

a sensor configured to detect the light reflected by the object;

at least one reflecting mirror to reflect the light reflected by the object in a horizontal direction to guide the light to the sensor; and a focusing lens disposed between the at least one reflecting mirror and the sensor to focus the reflected light redirected by the at least one reflecting mirror on the sensor, and wherein the light guide member comprises:

an incident surface through which the light generated by the light source is received;

a reflective surface provided with a plurality of reflective linear elements extending in a widthwise direction of the reflective surface to reflect the light received through the incident surface;

a plurality of guide surfaces to guide the light received through the incident surface; and an exit surface opposite to the reflective surface to allow light reflected by the reflective surface to exit, wherein an interval between immediately adjacent located reflective linear elements increases from a center of the light guide member towards the incident surface, and wherein the exit surface is provided as a convex lens having an arc-shaped section with a predetermined curvature, wherein the guide surfaces include a pair of first guide surfaces which are inclined from both ends of the reflective surface while forming an obtuse angle relative to the reflective surface, and a pair of second guide surfaces which are inclined from end portions of the first guide surfaces while forming an obtuse angle relative to the first guide surfaces, wherein an angle between the first and second guide surfaces is designed such that an incident angle of the light, which is incident into the second guide surface while being reflected from the reflective surface, is equal to or greater than a critical incident angle, wherein the light guide member includes polymethyl methacrylate resin having a critical incident angle of 41.8°.

17. A scanner module movably mounted below a document bed comprising:

a light source to generate light to be irradiated onto an object;

a sensor configured to detect the light reflected by the object;

at least one reflecting mirror to reflect the light reflected by the object in a horizontal direction to guide the light to the sensor;

a focusing lens disposed between the at least one reflecting mirror and the sensor to focus the reflected light redirected by the at least one reflecting mirror on the sensor; and a light guide member to guide the light generated from the light source toward the object, wherein the light guide member comprises:

a reflective surface provided with a plurality of reflective linear elements extending in a widthwise direction of the reflective surface to reflect the light received through an incident surface;

a plurality of guide surfaces to guide the light received through the incident surface; and an exit surface opposite to the reflective surface to allow light reflected by the reflective surface to exit, wherein the reflective surface is defined by a plurality of first reflective grooves and a plurality of second reflective grooves and, wherein an inclination angle of the first and second reflective grooves with respect to the widthwise direction of the light member are gradually increased from a center to both longitudinal ends of the light guide member.

18. The scanner module as claimed in claim 17, wherein the light guide member is disposed at a position not to interfere light reflected from the object.

19. A scanner module movably mounted below a document bed comprising:

a light source to generate light to be irradiated onto an object;

a sensor configured to detect the light reflected by the object;

at least one reflecting mirror to reflect the light reflected by the object in a horizontal direction to guide the light to the sensor;

a focusing lens disposed between the at least one reflecting mirror and the sensor to focus the reflected light redirected by the at least one reflecting mirror on the sensor; and a light guide member to guide the light generated from the light source toward the object, wherein the light guide member comprises:

a reflective surface provided with a plurality of reflective linear elements extending in a widthwise direction of the reflective surface to reflect the light received through an incident surface;

a plurality of guide surfaces to guide the light received through the incident surface; and an exit surface opposite to the reflective surface to allow light reflected by the reflective surface to exit, wherein the reflective surface is defined by a plurality of first reflective grooves and a plurality of second reflective grooves, and wherein an inclination angle of the first and second reflective grooves with respect to the widthwise direction of the light guide member are gradually increased from a center to both longitudinal ends of the light guide member, and wherein the light guide member has a length corresponding to a length of the object in a second direction, and wherein the light source is disposed to emit the light toward the light guide member in the second direction.

20. The scanner module of claim 19, wherein:

the light source comprises a first light source to generate first light to be irradiated onto a first region of the object, and a second light source to generate second light to be irradiated onto a second region of the object;

the light guide member comprises a first light guide member to guide the first light generated from the first light source toward the first region of the object, and a second light guide member to guide the second light generated from the second light source toward the second region of the object, wherein the first and second light guide members have a length corresponding to a length of the object in the second direction; and wherein the first region and the second region are disposed in a third direction different from the widthwise and second directions.

21. A multi-functional printing apparatus comprising:

a document bed; and a scanner module movably mounted below the document bed and operable to scan a document placed on the document bed, the scanner module including an illuminator to illuminate light onto the document;

a sensor configured to detect the light reflected by the document;

at least one reflecting mirror to reflect the light reflected by the document in a horizontal direction to guide the light to the sensor; and a focusing lens disposed between the at least one reflecting mirror and the sensor to focus the reflected light redirected by the at least one reflecting mirror on the sensor, wherein the illuminator including a first light guide member to direct light received from a first light source onto a surface of the document, and a second light guide member to direct light received from a second light source onto a surface of the document, each of the first and second light guide members having an incident surface through which the light is received, a reflective surface provided with a plurality of reflective linear elements extending in a widthwise direction with respect to the reflective surface to reflect the received light, guide surfaces to guide the received light, and an exit surface opposite to the reflective surface to allow light reflected by the reflective surface to exit, wherein the reflective surface is defined by a plurality of first reflective grooves and a plurality of second reflective grooves and, wherein an inclination angle of the first and second reflective grooves with respect to the widthwise direction of the light guide member are gradually increased from a center to both longitudinal ends of the light guide member.

22. The multi-functional printing apparatus as claimed in claim 21, wherein the interval between the reflective elements adjacent to one of longitudinal ends of the first light guide member is greater than the interval between the reflective elements at the center region of the first light guide member.

23. The multi-functional printing apparatus as claimed in claim 22, wherein a surface area of the exit surface is greater than a surface area of the reflective surface.

24. A scanner module comprising:

a light source to generate light to be irradiated onto an object;

a light guide member to guide the light generated from the light source toward the object;

a sensor configured to detect the light reflected by the object; and a reflection mirror to reflect the light reflected by the object toward the sensor, wherein the light source and the reflection mirror are integrated in a single module, wherein the light guide member comprises:

an incident surface through which the light generated by the light source is received;

a reflective surface provided with a plurality of reflective linear elements extending in a widthwise direction of the reflective surface to reflect the light received through the incident surface;

a plurality of guide surfaces to guide the light received through the incident surface; and an exit surface opposite to the reflective surface to allow light reflected by the reflective surface to exit, wherein the reflective surface is defined by a plurality of first reflective grooves and a plurality of second reflective grooves and wherein an inclination angle of the first and second reflective grooves with respect to the widthwise direction of the light guide member are gradually increased from a center to both longitudinal ends of the light guide member.

25. A multi-functional printing apparatus comprising the scanner module of claim 24.

26. A light guide member to guide a light comprising:

an incident surface through which a light generated by a light source is received;

a reflective surface having a plurality of reflective grooves to reflect the light received through the incident surface;

a plurality of guide surfaces to guide the light received through the incident surface; and an exit surface opposite to the reflective surface to allow light reflected by the reflective surface to exit, wherein the plurality of reflective grooves are extending while inclined with respect to a widthwise direction of the light guide member, and wherein an inclination angle of the plurality of reflective grooves with respect to a widthwise direction of the light guide member are gradually increased from a center to both longitudinal ends of the light guide member.

* * * * *